July 5, 1927.
L. D. MILLS ET AL
1,634,720
APPARATUS FOR PRECIPITATING AND FILTERING
Filed May 8, 1924     3 Sheets-Sheet 2
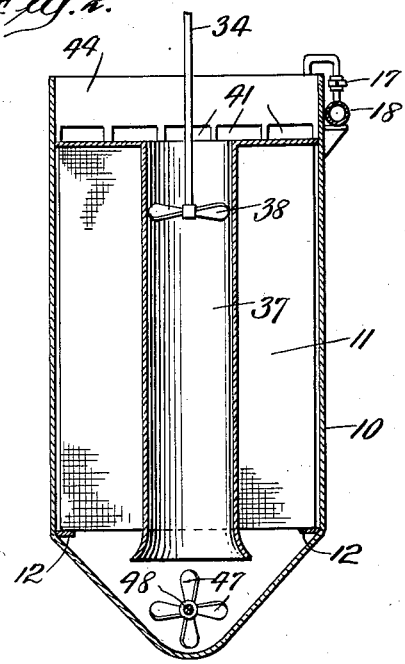
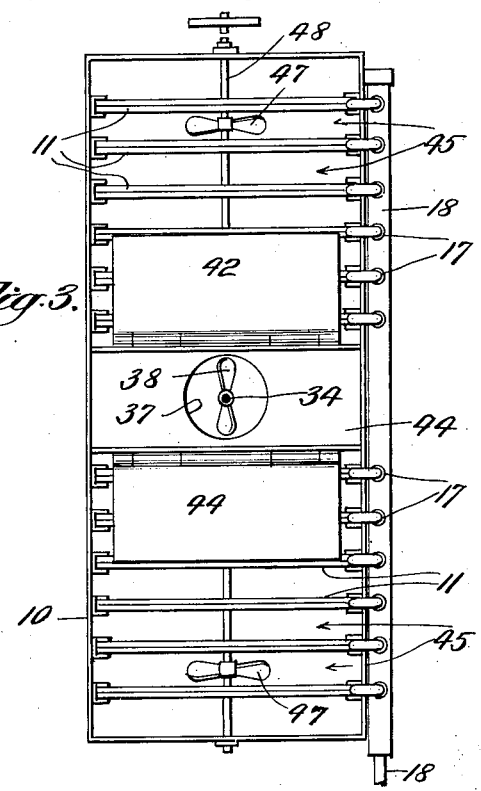
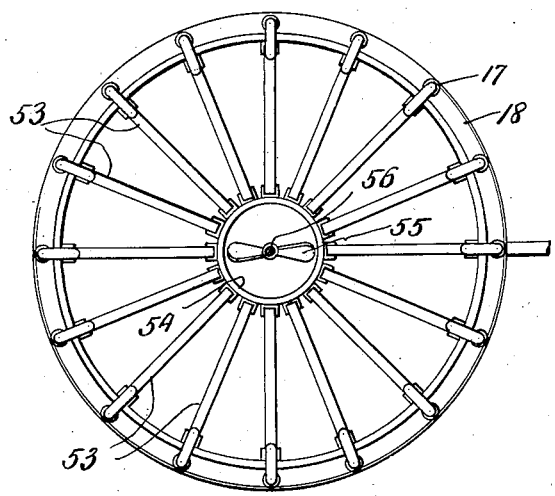
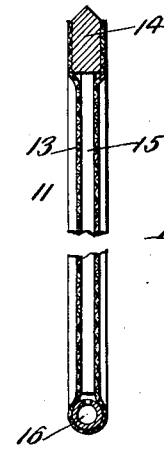
INVENTORS
Louis D. Mills
Thomas B. Crowe
By Archibald Cox
their ATTORNEY

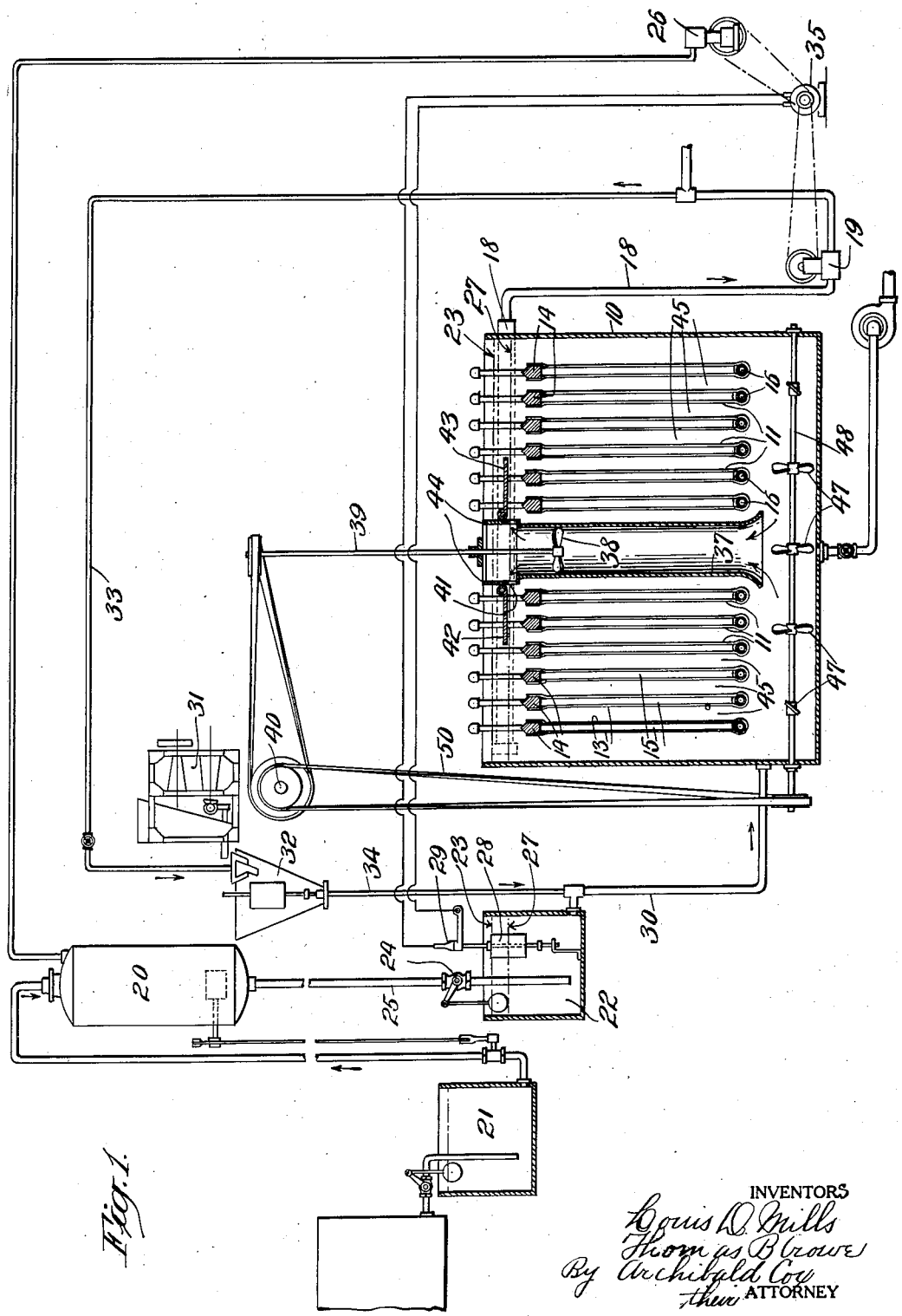

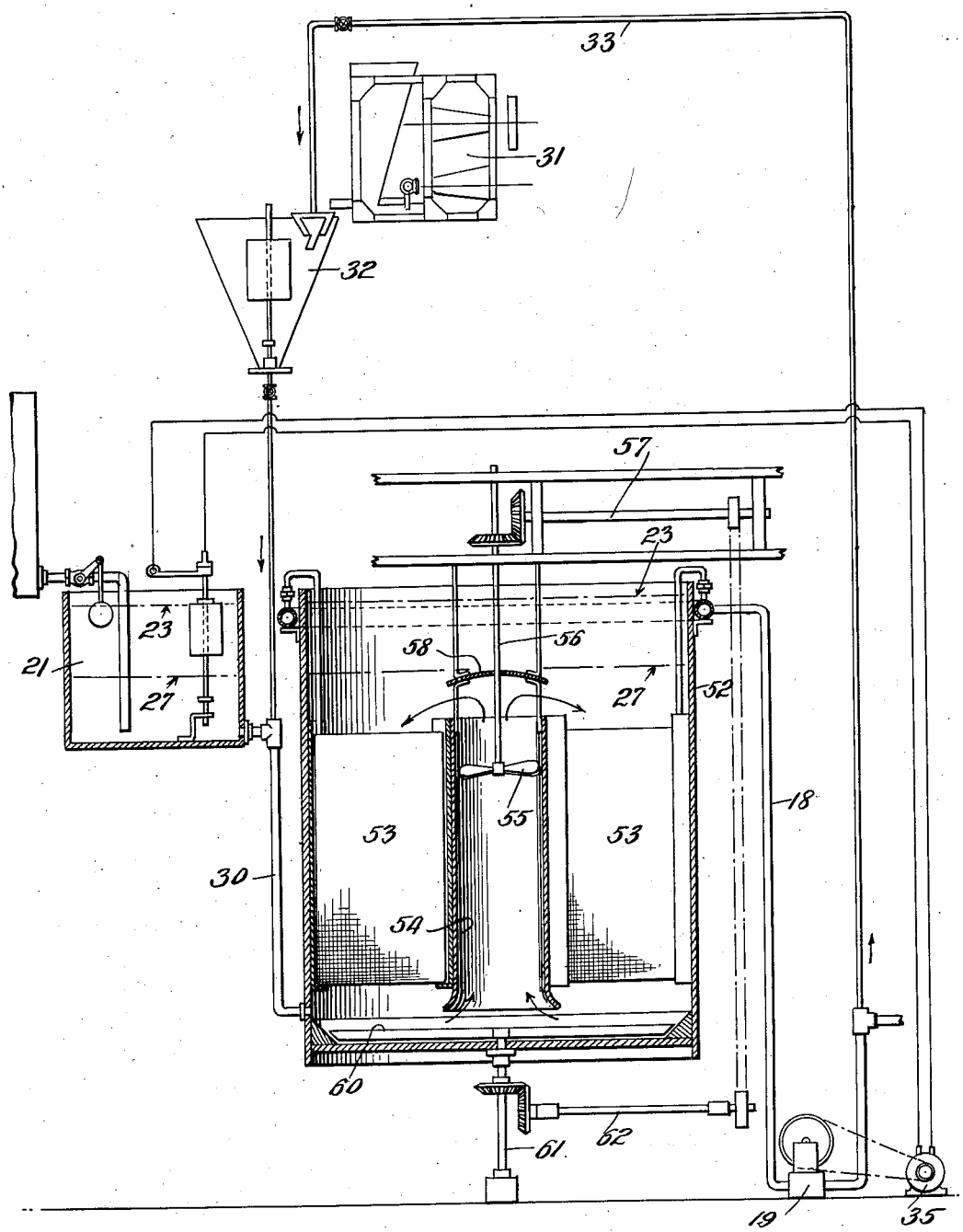

Patented July 5, 1927.

1,634,720

UNITED STATES PATENT OFFICE.

LOUIS D. MILLS, OF REDWOOD CITY, AND THOMAS B. CROWE, OF PALO ALTO, CALIFORNIA, ASSIGNORS TO THE MERRILL COMPANY, OF SAN FRANCISCO, CALIFORNIA, A CORPORATION OF CALIFORNIA.

APPARATUS FOR PRECIPITATING AND FILTERING.

Application filed May 8, 1924. Serial No. 711,923.

The invention relates to apparatus for precipitating and filtering valuable substances from solutions (and particularly metallic substances from metalliferous solutions, as, for instance, gold and silver from alkaline solutions of the cyanides) wherein the solution, treated by or containing the precipitant, is caused to move through a filtering medium upon which the solids are deposited; and the general object of the invention is to provide an apparatus which avoid difficulties and losses incident to the operation of the processes and apparatus heretofore known and insure more effective and complete precipitation and recovery.

The invention has to do particularly with providing for and utilizing the deposit in a particular manner of solids upon the filtering medium through which the solution is moved. In many cases, as in the precipitation of gold and silver from cyanide solutions, the final precipitation is effected as the solution flows through the layer of solids collected on the filter surface. We have found that the efficiency of this operation is largely increased by forming a layer of particular character, which is here designated equalized, meaning thereby not merely a layer of substantially uniform permeability, but more particularly a layer wherein the comparatively fine particles are distributed with the comparatively coarse particles throughout the layer in such substantial uniformity that the solution passing through the layer at any part thereof comes in intimate contact therewith. In many cases, as, for instance, in the precipitation of gold and silver from cyanide solutions, using zinc as the precipitant, the particles forming the layer are chiefly particles of precipitate, the precipitate being more effective to complete the precipitation than the precipitant, presumably because each particle thereof constitutes a couple; and the invention provides for exceptionally effective contact of the solution therewith. The invention avoids the necessity for unduly expensive apparatus and wasteful consumption of precipitant involved in sundry processes heretofore suggested.

In the practice of the invention, the solution containing the precipitant is preferably caused to circulate in such manner that the heavier solids do not settle, wholly within a filter tank, in contact with the entire filtering area of the filtering medium, as by flowing over it in one direction, and so that the circulating solution does not disturb or agitate the surface of the solution to entrain air therein.

The preferred type of apparatus for carrying out the invention is illustrated in the accompanying drawings in which Fig. 1 is a longitudinal section through one form of apparatus, with the ancillary apparatus indicated diagrammatically; Fig. 2 is a transverse section through the apparatus shown in Fig. 1; Fig. 3 is a top plan of the apparatus; Fig. 4 is a view similar to Fig. 1 of a modified form of apparatus; Fig. 5 is a plan of the apparatus shown in Fig. 4; and Fig. 6 is a section through one of the filter units.

The form of apparatus shown in Fig. 1 comprises a rectangular filter tank 10 having a series of filter units 11 suspended therein and supported in place by means of the ledges 12 (Fig. 2) projecting inwardly from the bottoms of the sides of the apparatus. In the illustrated embodiment of the invention the filter units are of the vacuum leaf type, but it will be understood that the invention is not to be limited to this type of filtration inasmuch as it is equally applicable to pressure filtration practiced within closed vessels. Vacuum leaf filtration is preferred in most instances because it permits of cheaper construction and the operations are more easily observed. The general features of construction and mode of operation of the filter units 11 are well-known and need no detailed description. The filtering medium 13 (Fig. 6) may be canvas or other suitable material, the two sides of each filter unit being secured to the cross-bar 14 and separated by strips 15 of wood, cocoa matting or the like to provide proper drainage. The top of the support 14 is tapered to prevent lodgment of solids thereon. The perforated pipe 16 of each filter unit is detachably connected by a coupling 17 with the pipe 18 which leads to the intake of the pump 19 for drawing the solution through the filter leaves.

The clarified solution to be treated is contained in tank 21, whence it is caused to pass into the steady-head tank 22 through a vacuum tank 20 in which a vacuum is maintained by pump 26. The maximum or upper solution level 23 in tank 22 and tank 10 is kept constant by the float controlled valve 24 in the inlet pipe 25, and the minimum or lower solution level 27 is controlled by a float 28 which operates an electrical contact 29 to stop the motor 35 connected with the pumps 19 and 26 when the solution reaches the low level 27. The steady-head tank 22 is connected by the pipe 30 with the filter tank 10. As the solution flows from the steady-head tank into the bottom of the filter tank it is supplied with a precipitant. The precipitant (preferably zinc dust when gold and silver are recovered from cyanide solutions) is supplied from a feeder 31 to a mixing cone 32 which receives solution from the pump 19 through the pipe 33. Thus a continuous stream in which the precipitant is contained, substantially an emulsion, passes down the pipe 34 into the pipe 30. The parts shown diagrammatically are of usual construction and mode of operation.

The means for effecting a homogeneous mixture of the coarser and finer particles of the solids in the solution in the filter tank 10 and the rapid distribution of the homogeneously mixed particles in equalized layers over the entire area of the filter surfaces, comprise a vertically arranged cylindrical conduit or passageway 37 located substantially in the middle of the filter tank 10, as shown in Fig. 3, and a propeller 38 arranged in the upper part of the conduit. The propeller 38 is mounted on the lower end of a vertical shaft 39 driven from a shaft 40 connected with any convenient source of power. The propeller 38 acts to draw the solution in the tank 10 upwardly through the conduit 37 and to discharge it through the openings 41 and against the baffles 42 and 43 hinged to cross-pieces 44 secured to the upper part of the tank. The baffles 42 and 43 serve to deflect the solution so that it will flow down through the passageways 45 between the filter units 11. The baffles also prevent the solution discharged through the upper end of the conduit from disturbing and rupturing the surface of the liquid in the tank. Thus the absorption of air in the solution from this cause is prevented.

The solution discharged over the upper ends of the filter units flows downwardly between the units by gravity. In this manner the solution with the solid particles in suspension is caused to flow in contact with the entire filtering area of the filter units, so that as the solution is sucked through the filtering media 13 the solids in suspension are deposited in an even layer on the entire filter surfaces. Bearing in mind that the final precipitation takes place in the layers of solids on the filter surfaces, it will be understood that this rapid circulation of the solution wholly within the tank 10, by causing relatively large proportions of the solution to flow in contact with the layers of solids on the filter surfaces within a relatively short time, results in a speedy and effective precipitation.

In order that the heavier particles of solids may be prevented from settling to the bottom of the tank, a series of agitating propellers 47 are provided mounted on a shaft 48 located under the lower ends of the filter units and in the trough-shaped bottom 49 of the filter tank. The shaft 48 is driven from the pulley 40 by the belt 50. By keeping the larger particles of solids in agitation with the smaller particles and the solution, the mixture becomes equalized and in that condition is drawn up through the conduit and distributed over the upper ends of the filter units. Consequently, as the solution flows down over the filter surfaces and in contact therewith, the homogeneously mixed coarser and finer particles of precipitant are deposited over the entire filtering area of the filter units and the solution flows through the deposited layers in intimate contact with the large and small particles composing them.

When a sufficient flow of solution has passed through the filter units and it is desired to remove the solids which have accumulated on the filter surfaces, the flow of solution and precipitant is discontinued, the pump 19, however, being kept in action until the solution has been lowered nearly to the bottom of the filter leaves. Each leaf is then removed from the filter tank and cleaned, a partial vacuum being maintained on the leaf by means of a hose which may be attached to the suction of the pump 19. During this clean-up the precipitation will necessarily be imperfect and consequently the effluent solution from the pump 19 should be returned to the tank for retreatment. The recovery or clean-up of the precipitate may be effected without interrupting the operation of the apparatus as a whole, by successively connecting each leaf to the suction of pump 19 and then taking the leaf out of the tank for removal of the precipitate. By keeping the filter leaf connected with the suction of the pump 19 the cake of filtrate is not only prevented from dislodgment during the transfer but is also dried and so may be more easily handled.

In the form of apparatus shown in Figs. 4 and 5 the filter tank 52 is cylindrical in shape and the filter leaves 53 are radially disposed around the centrally arranged vertical conduit 54. The propeller 55 is mounted on the lower end of a shaft 56 which is driven from a shaft 57 connected with a convenient source of power. The mixture of solution and solids drawn up through the conduit 54 by the propeller 55 is prevented from agitating the upper surface of the solution in the tank and is deflected over the upper ends of the filter units 53 by means of the centrally arranged baffle 58. In this form of apparatus the filter tank is shown with a flat bottom adjacent to which is located an agitator or propeller with horizontal arms 60 mounted on the upper end of a shaft 61 connected with a shaft 62 driven from the shaft 57. In other respects the ancillary parts of the apparatus shown in Fig. 4 are the same in construction and function as the corresponding parts of the preferred form of apparatus, and are given the same reference characters. The vacuum tank 20 shown in Fig. 1 may be dispensed with under certain conditions of operation and is not illustrated in the form of apparatus shown in Fig. 4.

In both forms of apparatus it will be noted that the centrally arranged conduit is of substantially the same length as the filter leaves or units and is arranged parallel with them. Thus a constant circulation of solution is maintained wholly within the filter tank, the solution passing through the conduit in one direction and over and in contact with the filter surfaces in the opposite direction. Other obvious arrangements would result in changing the direction of flow of the solution. Whatever the arrangement of the means for agitating and the means of maintaining the circulation of solution wholly within the filter tank, the object is to keep the coarser and finer particles of solids homogeneously mixed in the solution, so that they will be distributed in that relationship over the entire filtering area of the filtering units, and so result in the most effective precipitation.

The invention has been particularly described as applied to the recovery of gold and silver from cyanide solutions by means of zinc dust, but it will be understood that the apparatus herein described and particularly pointed out in the claims is applicable to the recovery of other valuable substances from solutions by means of suitable precipitants.

Having thus described the invention, we claim:—

1. An apparatus for precipitating and filtering from solution comprising, a tank, means for introducing a solution containing particles of solids in suspension into the tank, a series of vertically arranged filter units in the tank, a vertically arranged conduit in the tank, means for drawing the solution in the tank up through the conduit, and means located above the discharge end of the conduit for preventing the solution drawn up through the conduit from rupturing the surface of the solution in the tank and for directing the flowing solution outwardly over the upper ends of the filter units.

2. An apparatus for precipitating and filtering from solution comprising, a tank, means for introducing a solution containing particles of solids in suspension into the tank, a series of vertically arranged filter units suspended in the tank, a vertically arranged conduit in the tank, the upper discharge end of the conduit terminating below the surface of the solution in the tank, means for drawing the solution up through the conduit, and means located above the discharge end of the conduit for directing the solution drawn up through the conduit outwardly over and in contact with the upper ends of all the filter units so that the solution will flow down over the entire filtering area of the filter units.

3. An apparatus for precipitating and filtering from solution comprising, a cylindrical tank, means for introducing a solution containing particles of solids in suspension into the tank, a vertically arranged conduit located centrally in the tank, the discharge opening of the conduit being located below the surface of the solution in the tank, a series of radially arranged filter units in the tank, means for drawing the solution up through the conduit, and deflecting means located above the discharge opening of the conduit for directing the solution outwardly over the upper ends of the filter units.

4. An apparatus for precipitating and filtering from solution comprising, a tank, means for introducing a solution containing solids in suspension into the tank, a series of vertically arranged filter units suspended in the tank, a vertically arranged conduit in the tank, the upper discharge end of which is located below the surface of the solution in the tank, means for drawing the solution up through the conduit, and a deflector located over the upper end of the conduit for preventing the solution drawn up through the conduit from rupturing the surface of the solution in the tank.

LOUIS D. MILLS.
THOMAS B. CROWE.